Jan. 12, 1937. J. HOLAN 2,067,763
RECEPTACLE
Filed Oct. 29, 1934
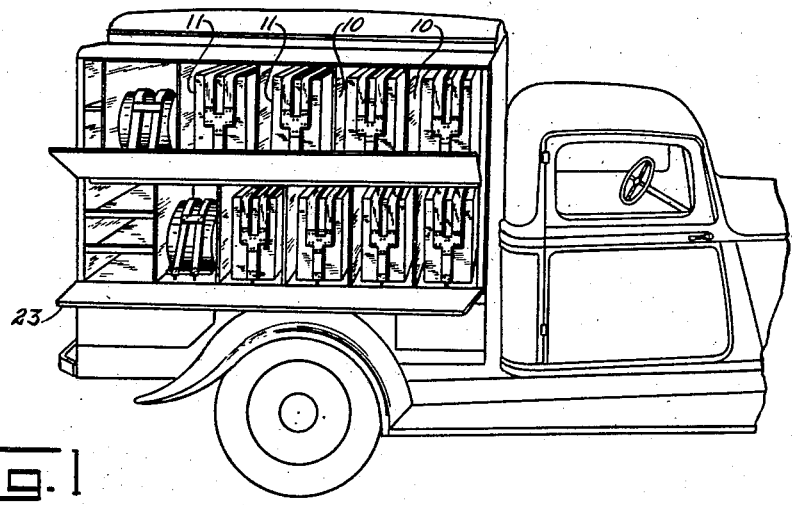
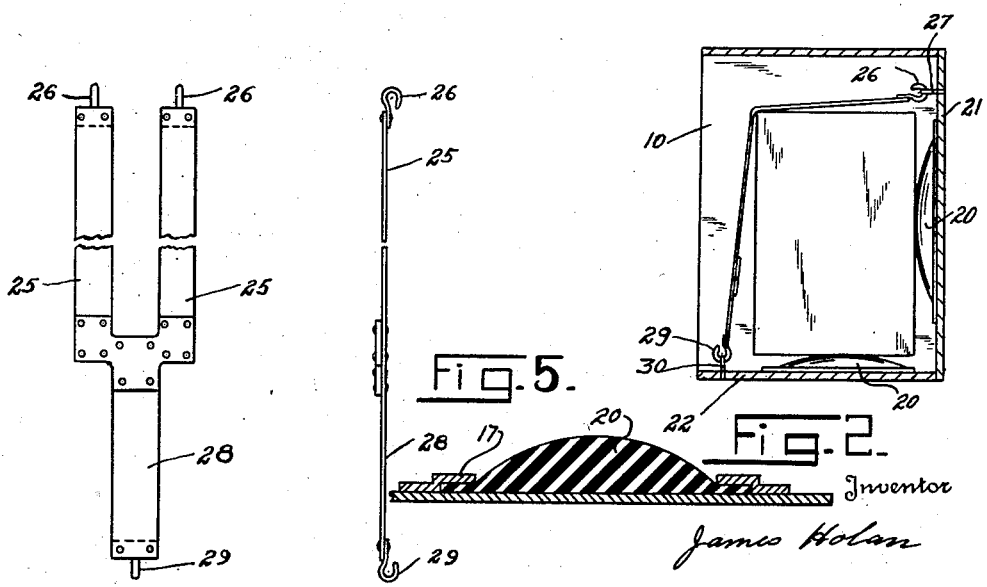
Inventor
James Holan
By Bates, Goldrick & Teare
Attorney Patented Jan. 12, 1937

2,067,763

UNITED STATES PATENT OFFICE 2,067,763

RECEPTACLE

James Holan, Lakewood, Ohio, assignor to American Coach and Body Company, Cleveland, Ohio, a corporation of Ohio Application October 29, 1934, Serial No. 750,555

2 Claims. (Cl. 220—63)

This invention relates to receptacles that are used in public utility trucks for holding gas or electric light meters. Usually such meters are carried in compartments at the side of the vehicle where they are accessible from the exterior side thereof. Due to the fact however, that meters contain delicate mechanism, it is necessary to pad the walls of each receptacle so as to minimize the vibration to which the meters are subjected, while in transit. One form of padding which has heretofore been used has comprised a layer of felt which has been cemented onto the walls of the receptacle. This arrangement has not been satisfactory however, because the felt is easily scuffed whenever the meters are inserted into, or removed from the receptacle. The scuffed felt destroys the protective qualities and causes the layers to peel off very quickly.

An object of my invention therefore, is to make a receptacle, which is so constructed that the padding remains intact, notwithstanding the use to which it may be subjected in the handling of meters.

Fig. 1 is a perspective view of part of a motor vehicle wherein the meter compartments are built into the side structure of a vehicle body; Fig. 2 is a section taken through the meter compartment illustrated in Fig. 1; Figs. 3 and 4 are front and side views, respectively, of an elastic harness that may be used for holding the meters in place, and Fig. 5 is a section on a scale larger than that used in Fig. 2 and taken through the wall of the compartment.

The vehicle body which is illustrated in Fig. 1 is shown as having partitions 10 adjacent the side wall, which divide the body into meter compartments, these compartments being adapted to be connected by doors 23 which are hinged to the vehicle body. The meters, which are indicated at 11, are adapted to be held in place within the compartments against movement by means of a harness, which may be made of elastic webbing and attached at its ends to the back and bottom walls, respectively, of the compartment.

In the preferred construction, the harness comprises two strips 25, each of which has a hook 26 carried thereby for connection to an eye 27, that is attached to the back wall. The strips 25 are attached to the ends opposite the hooks to a single strip 28, the free end of which is provided with a hook 29 for attachment to an eye 30 that is fastened to the bottom compartment. The elastic harness, when in use, extends across the meter, and firmly holds it in place within its compartment.

To protect a meter against damage by contact with either the back wall or bottom of the compartment, I have devised a protective device in the form of a padding 20, which may be made of flexible material, such as rubber, which has a tough wear resisting surface exposed toward the central region of the receptacle and which receives directly the impact of the load. The marginal edges of the flexible material may extend beneath a flange 17 on a frame 18 which is adapted to be welded, or otherwise securely fastened to the inner surface of the receptacle. The overhanging flange on the frame, thus protects the padding whenever the meter strikes against it during the inserting or removal operation.

The meter holding device which I have devised has resulted in an arrangement by means of which meters may be quickly inserted into a compartment or removed therefrom and effectively locked therein against movement with reference to the body while the vehicle is in motion. Additionally, the compartments are provided with means for protecting the meters against damage which may result from contact between the walls of the compartment and the meter casing.

I claim:—

1. A receptacle for meters and the like, having a bottom and back wall, padding on each of the walls against which a meter may be positioned, and a harness attached to the back and bottom walls and adapted to extend cross the meter for removably holding it in place in the receptacle.

2. A receptacle for meters having two walls disposed at right-angles to each other, padding on each of the walls, and an elastic harness adapted to be connected to the walls to provide the sole means for holding a meter against the padded surfaces.

JAMES HOLAN.